(12) United States Patent
Callamand et al.

(10) Patent No.: US 8,950,454 B2
(45) Date of Patent: Feb. 10, 2015

(54) TIRE TREAD FOR CIVIL ENGINEERING MACHINE

(75) Inventors: Stephane Callamand, Marsat (FR); Denis Bijaoui, Bangkok (TH)

(73) Assignees: Compagnie Generale des Establissements, Clermont-Ferrand (FR); Michelin Recherche et Technique S.A., Granges-Paccot (CH)

( * ) Notice: Subject to any disclaimer, the term of this patent is extended or adjusted under 35 U.S.C. 154(b) by 1116 days.

(21) Appl. No.: 12/993,554

(22) PCT Filed: May 13, 2009

(86) PCT No.: PCT/EP2009/055755
§ 371 (c)(1),
(2), (4) Date: Feb. 9, 2011

(87) PCT Pub. No.: WO2009/141253
PCT Pub. Date: Nov. 26, 2009

(65) Prior Publication Data
US 2011/0120607 A1    May 26, 2011

(30) Foreign Application Priority Data

May 20, 2008   (FR) ...................................... 08 53249

(51) Int. Cl.
*B60C 11/03*            (2006.01)
(52) U.S. Cl.
CPC ......... *B60C 11/0311* (2013.04); *B60C 11/0323* (2013.04); *Y10S 152/902* (2013.01)
USPC .................. 152/209.18; 152/209.17; 152/902
(58) Field of Classification Search
CPC ............ B60C 11/0323; B60C 11/0311; B60C 11/0316; B60C 11/032; B60C 11/11; B60C 11/24; B60C 11/02; B60C 2200/06; B60C 2200/065

USPC .......... 152/209.18, 209.17, 209.6, 902, 154.2
See application file for complete search history.

(56) References Cited

U.S. PATENT DOCUMENTS

| 1,877,600 | A | * | 9/1932 | Seiberling et al. ........ 152/209.16 |
| 1,877,988 | A | * | 9/1932 | Schrank ................... 152/209.16 |
| 2006/0090827 | A1 | | 5/2006 | Merino Lopez | |

FOREIGN PATENT DOCUMENTS

| DE | 103 09 759 A1 | 1/2005 |
| FR | 1 357 078 A | 4/1964 |

(Continued)

OTHER PUBLICATIONS
International Search Report dated Jul. 15, 2009 for International Application No. PCT/EP2009/055755.

*Primary Examiner* — Eric Hug
(74) *Attorney, Agent, or Firm* — Dickinson Wright PLLC

(57) ABSTRACT

Tire tread for civil engineering works vehicle, this tread having a tread surface (10) intended to come into contact with the ground, this tread comprising a central part (21) delimited by grooves (3) of circumferential overall orientation, these grooves delimiting lateral parts (22) axially towards the outside of the central part (21), each lateral part (22) being provided with a plurality of transverse grooves (6) delimiting a plurality of blocks (7), the transverse grooves (6) having a cross section of minimum area (ST) and being distributed substantially uniformly in the circumferential direction, this tread being characterized in that the central part (21) is provided with a plurality of channels (51) extending transversely under the tread surface (10) and passing right through the said central part (21), each channel (51) comprising a first and a second end (52, 51), these first and second ends opening into the grooves (3) of circumferential overall orientation, at least one end of each channel opening into a transverse groove (6) of the shoulder parts (22), and in that each channel (51) has a cross-sectional area (SC) at least equal to 5% of the area of the minimum cross section (ST) of the transverse groove (6) into which it opens.
Tire provided with such a tread.

9 Claims, 4 Drawing Sheets

(56) References Cited

FOREIGN PATENT DOCUMENTS

| | | | |
|---|---|---|---|
| JP | 62 241712 | A | 10/1987 |
| JP | 02 310108 | A | 12/1990 |
| JP | 05 169913 | A | 7/1993 |
| WO | WO 00/00357 | A | 1/2000 |
| WO | WO 2004/110790 | A | 12/2004 |

\* cited by examiner

Sectional II-II

Sectional VI-VI

TIRE TREAD FOR CIVIL ENGINEERING MACHINE

The invention relates to tires for civil engineering works vehicles carrying very heavy loads and more particularly relates to the treads of such tires.

Civil engineering works vehicles are fitted with tires, which, as a general rule, are subjected to very high loads and very great variations in load.

These tires are provided with treads which, by comparison with the thicknesses of the treads of other types of tire, such as heavy goods vehicle tires, contain very large thicknesses of rubber compound which exhibit a very high level of hysteresis. What is meant here by a very great thickness is a thickness in excess of 30 mm and which may be as much as 120 mm.

As a result, the effect of the running cycles and of the cyclic variations in the load carried causes high temperatures to appear in the treads of these tires, particularly in the central part of the treads.

In the prior art, it is known practice to form channels known as ventilation channels, it being possible for these ventilation channels to pass right across the tread from one side to the other (see, in particular, patent document U.S. Pat. No. 1,877,988); the purpose of such channels is to allow a certain removal of the heat energy produced in the tread by circulating ambient air through the said channels.

While this device does provide some degree of reduction in the levels of heat in a tread, it is nonetheless still necessary to improve the efficacy of this device particularly in the central part of the treads of tires for civil engineering works vehicles one of the special features of which is that they are far thicker than the treads of the other types of tire.

To this end, the invention proposes a tread for a tire to be fitted to a civil engineering works vehicle. This tread, of a total thickness E, has a tread surface intended to come into contact with the ground and comprises a central part delimited by grooves of circumferential overall orientation, these grooves delimiting lateral parts axially towards the outside of the central part, each lateral part being provided with a plurality of transverse grooves delimiting a plurality of blocks, the transverse grooves having a cross section of minimum area (ST) and being distributed substantially uniformly in the circumferential direction.

This tread is characterized in that the central part is provided with a plurality of channels extending transversely under the tread surface and passing right through the said central part, each channel comprising a first and a second end, these first and second ends opening into the grooves of circumferential overall orientation, at least one end opening into a transverse groove of the shoulder parts, and in that each channel has a cross-sectional area (SC) at least equal to 5% of the area of the minimum cross section (ST) of the transverse groove into which it opens.

For preference, the cross section of each channel is greater than or equal to 20% and at most equal to 30%. For values in excess of 30%, mechanisms may arise that cause problems with the endurance of the material, given the appreciable reduction in compression rigidity of the central part of the tread.

The combination of the invention placing a channel in the central part in communication with at least one transverse groove in the continuation thereof allows a very appreciable increase in the exchanges of heat between the material and the ambient air. There is therefore a switch from laminar flow to turbulent flow conditions, with a heat exchange coefficient increased by a factor of ten by comparison with its initial value (the case where the channels are not extended by transverse grooves). This then promotes the transfer of the heat energy generated within the material of the central part via the surfaces delimiting the channels, these surfaces being subjected to movements of air from the transverse grooves which act as funnels to encourage the air to enter the channels.

In order to ensure that the ventilation effect of the central part of a tread according to the invention is sufficiently long-lasting, the channels are formed at a distance from the tread surface which exceeds half the thickness of this central part.

For preference, the mean line of each channel of the central part is substantially in the continuation of the mean direction of the transverse groove into which it opens. What is meant here by "substantially in the continuation of" is that the angular offset between the mean directions of the transverse groove and of the associated channel is at most equal to 15 degrees.

In a preferred alternative form of the invention, the channels, formed in the central part of a tread, have, when considered in twos, at least one end in common, that is to say that each channel is connected by one of its ends to the end of at least one other channel.

In this preferred alternative form, the invention proposes a tire for a Civil Engineering vehicle provided with a tread of total thickness E and having a tread surface intended to come into contact with the ground, this tread comprising a central part delimited by grooves of circumferential orientation, these grooves delimiting, axially towards the outside, lateral parts, each lateral part being provided with a plurality of transverse grooves delimiting a plurality of blocks.

The central part is provided with a plurality of channels extending transversely under the tread surface, each channel having a cross section, each channel passing right through the central part to open into the two grooves of circumferential orientation.

This tread is characterized in that the channels have, considered in twos, substantially crossed orientations, that is to say orientations that between them make a mean angle of at least 10°, and in that a channel is connected at one of its ends to one end of another channel, at least one end of each channel opening into a transverse groove that passes through a lateral part of the tread.

Thanks to these preferred conditions, the ventilation efficacy (turbulence occurring for a diameter of each channel at least equal to 5% of the cross section of the transverse groove into which the said channel opens) afforded by the channels in the central part is further improved because a continuous network of channels is created, increasing the circulation of air through the said channels.

For preference, the cross section of each channel, whatever the alternative form considered, is greater than or equal to 20% and at most equal to 30% of the cross section of the transverse groove passing through a lateral part of the tread.

It has been found that the channel area—i.e. the surface area of channel wall—that needs to be created per unit volume (expressed in $m^3$—cubic meters) needs preferably to be greater than 1 $m^2$ (square meter) in order to permit sufficient thermal gain. What is meant here by sufficient thermal gain is that the effect of the ventilation within the central part allows an increase in running speed by 1 km/h, something which is of particular advantage to tires fitted to civil engineering works vehicles. For preference, this heat exchange surface area is at least equal to 4 $m^2$ per unit volume expressed in $m^3$. It has also been observed that, for the same wall area, it was more advantageous to have a large cross section of channel (for example, two channels of 12 mm diameter are more effective than three channels of a diameter of 8 mm)

Of course, it is possible, and this is true irrespective of the alternative form according to the invention considered, to reduce the thermal level of the entire tread, notably that of the lateral parts, by providing, in addition to the presence of channels in the central part, channels in the shoulder parts also. These channels open both to the outside of the tread and into a circumferentially orientated groove.

The alternative forms of tread according to the invention are particularly intended to equip a tire that has a carcass reinforcement surmounted radialy towards the outside by a crown reinforcement, the latter itself being surmounted radialy towards the outside by the tread according to the invention.

Other features and advantages of the invention will become apparent from the description given hereinafter with reference to the attached drawings, which, by way of nonlimiting examples, show alternative forms of embodiment of the subject matter of the invention.

To make the following description of the drawings easier to understand, the same references are used to describe elements that have a structure that is identical or similar from a functional standpoint.

The size of the tire used in the description of the alternative forms according to the invention and for the comparative tests is 40.00 R 57.

Figure 1:
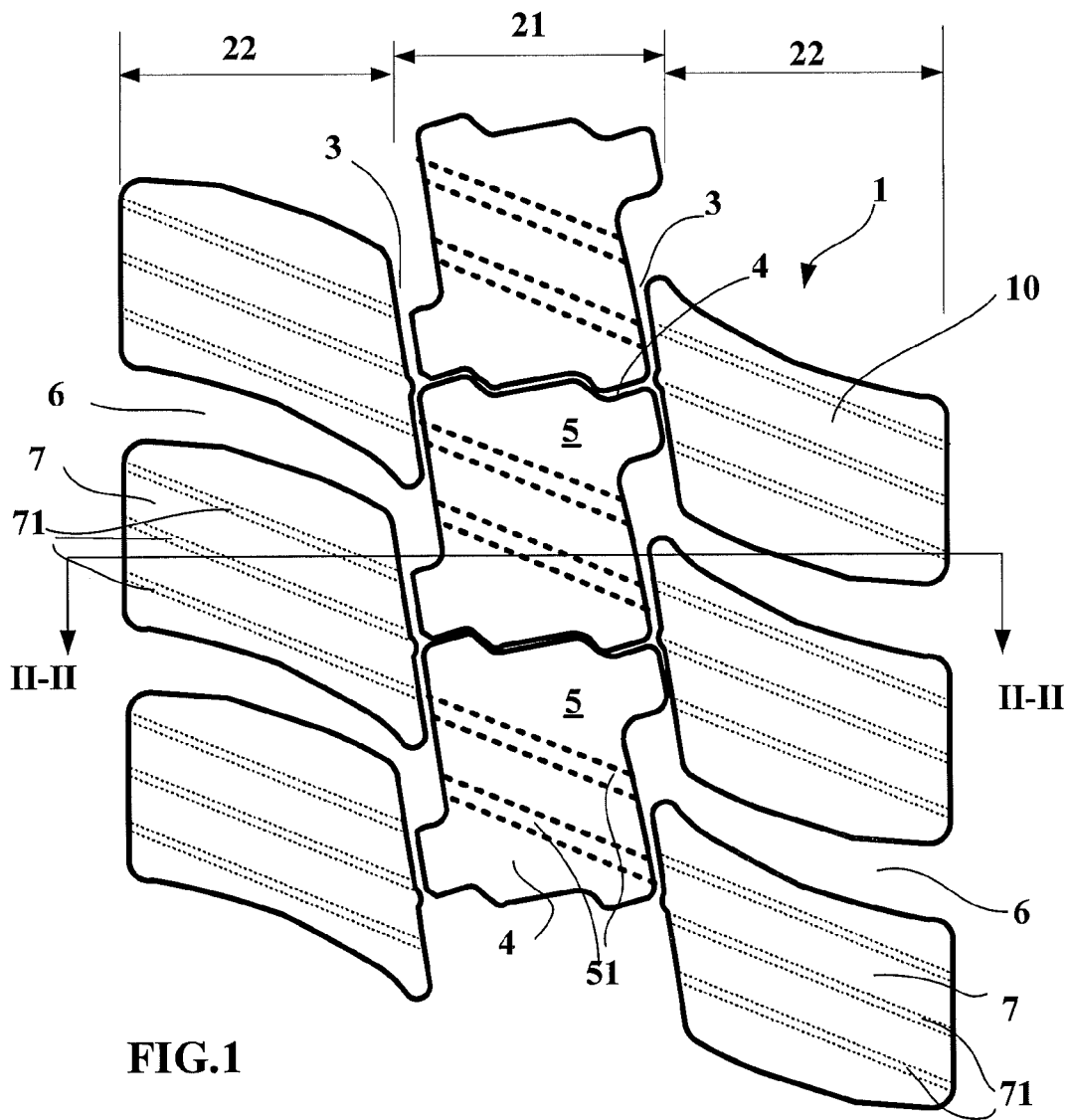
FIG. 1 shows a surface view of a tread of a tire according to a first alternative form of the invention.

FIG. 1, which is a part view of the tread surface 10 (the surface intended to come into contact with the ground during driving) of a tread 1 according to the invention, applied to a tread pattern design marketed under the name XDR, shows three distinct parts a central part 21 axially delimited by two grooves 3 of circumferential overall orientation and, on each side of this, a shoulder part 22, this central part 21 also being provided with grooves 4 of transversal overall orientation (that is to say which are oriented substantially in the axial direction of rotation of the tire) of a wavy shape. These transverse grooves 4 together with the circumferential grooves 3 delimit very thick solid blocks 5.

The overall width of the tread for the size considered is 975 mm

The width of the central part is substantially equal to 280 mm.

The mean width of the circumferential grooves is 11 mm, for a depth of 75 mm.

The transverse grooves 4 of the central part 21 have a mean width of 8 mm and a depth of 77 mm and a minimum cross-sectional area (ST) equal, in this instance, to 616 mm$^2$.

Axially on each side of this central part 21 there are shoulder parts 22, each shoulder part being provided with transverse grooves 6 of curved overall shape and which widen towards the outside of the tread (that is to say in the direction axially away from the central part). The transverse grooves 6 have a minimum width of 60 mm and a depth of 85 mm (measured at the axially innermost point, that is to say the most central part of the tread). These transverse grooves in the shoulder parts have, when viewed in cross section in a plane perpendicular to the walls that delimit these grooves, minimum cross sections the areas of which are substantially equal to 5100 mm$^2$ These transverse grooves 6 delimit a plurality of blocks 7 which are circumferentially offset with respect to the blocks 5 of the central part 21. In addition, the shoulder parts 22 are oriented with respect to one another in such a way that the design of the tread is not directional. Here, if a tread design is said to be directional, that means that the design leads to different loadings according to the direction in which the tire provided with such a tread rotates.

According to the invention, the blocks 5 of the central part 21 are provided with a plurality of channels 51 of circular cross section and diameter 24 mm, these channels 51 passing right through these blocks 5 to open into the circumferential grooves 3. These channels are produced at a depth of 72% of the groove depth (that is to say 56% of the tread thickness). Each block 5 of the central part 21 has dimensions such that the volume of material is substantially 7.6 dm$^3$ (cubic decimeter). The mean length of a channel is 303 mm which, for the two channels, represents a working wall area for heat exchange of 4.6 dm$^2$ (square decimeters)—this value is in excess of 0.6 dm$^{-1}$ working area per unit block volume (that is to say in excess of 6 m$^2$ of heat exchange area per unit volume expressed in m$^3$).

Each channel has a cross-sectional area (SC) (here equal to 452 mm$^2$) i.e. of 8.9% (in excess of 5%) of the area of the minimum cross section (ST) of the transverse groove into which it opens.

Furthermore, each channel 51 of the central part 21 opens at one of its ends opposite a curved transverse groove 6 of a shoulder part 22. As will be noticed, the cross-sectional area of each channel 51, equal to 452 mm$^2$, is less than the cross-sectional area of the transverse groove 6 into which this channel opens.

In addition to the presence of channels 51 in the central part 21 as has just been described, a plurality (in this instance three) of channels 71 oriented substantially like the transverse grooves that delimit the said blocks are provided on each shoulder part 22 and in each block 7 of the said shoulder parts. These channels 71 have the function of reducing the level of heat in the blocks 7 of the shoulder parts 22.

These channels 71 have a shape of circular cross section and a diameter of 12 mm. Each block 7 of the shoulder parts 22 has a volume of 6.9 dm$^3$ (for a block 7 height of 0.96 dm).

Figure 2:
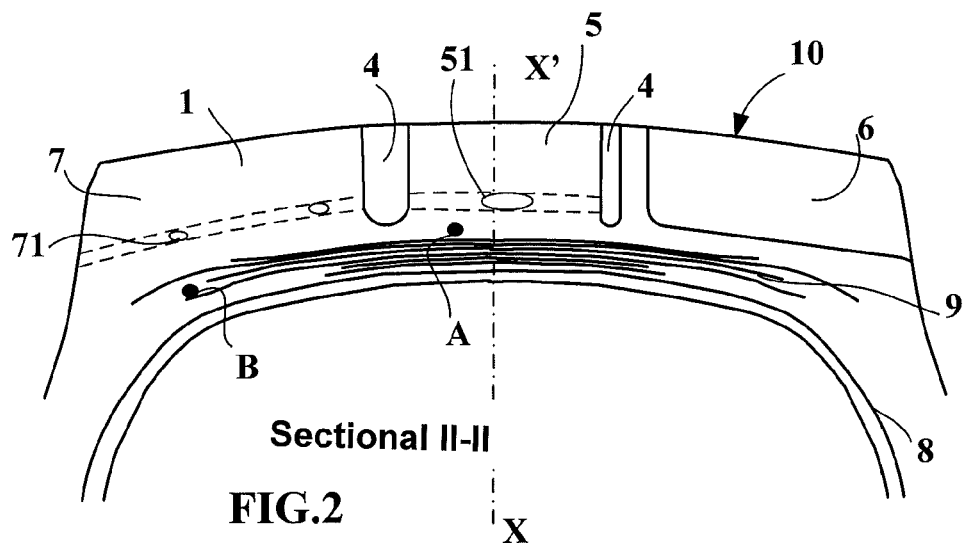
FIG. 2 shows a view in cross section on a plane of section labeled II-II in FIG. 1.

FIG. 2, which is a cross section on a plane of section labeled II-II in FIG. 1, shows a carcass reinforcement 8 surmounted radialy on the outside by a crown reinforcement 9 formed of a plurality of reinforcing plies stacked one on top of another. The crown reinforcement 9 is surmounted radialy on the outside by the tread 1, the tread surface 10 of which is shown in FIG. 1. In this sectional view, the positions of the thermocouples used to record the operating temperatures are labeled using the references (A) and (B). One measurement point (A) is considered near the middle part of the tread and as close as possible to the crown reinforcement. A second point (B) is considered at the end of the crown reinforcement. The temperatures are recorded for the following conditions of use:

Inflation pressure: 6 bars; supported load: 48 T; speeds: 15 and 20 km/h.

These measurements which are collated in Table I allow the highly favorable impact of the presence of channels in the central part of the tread to be compared, on one and the same tire.

TABLE I

| 40.00 R 57 | Temperature at point A Degrees Celsius (° C.) | | Temperature at point B Degrees Celsius (° C.) | |
|---|---|---|---|---|
| XDR Speed (km/h) | Without channels | With channels | Without channels | With channels |
| 15 km/h | 86 | 74 | 86 | 78 |
| 20 km/h | 100 | 88 | 100 | 88.5 |

As may be seen, creating channels in the central part of the tread, with these channels opening both into the circumferential grooves and into at least one transverse groove in the shoulder, allows an appreciable thermal gain (about 12° C. at 20 km/h in the middle) to be achieved, for example allowing an increase in the mean driving speed in use. Thanks to the additional presence of channels in the shoulder parts, a substantially equivalent gain in operating temperatures in these shoulder parts can be obtained.

Figure 3:
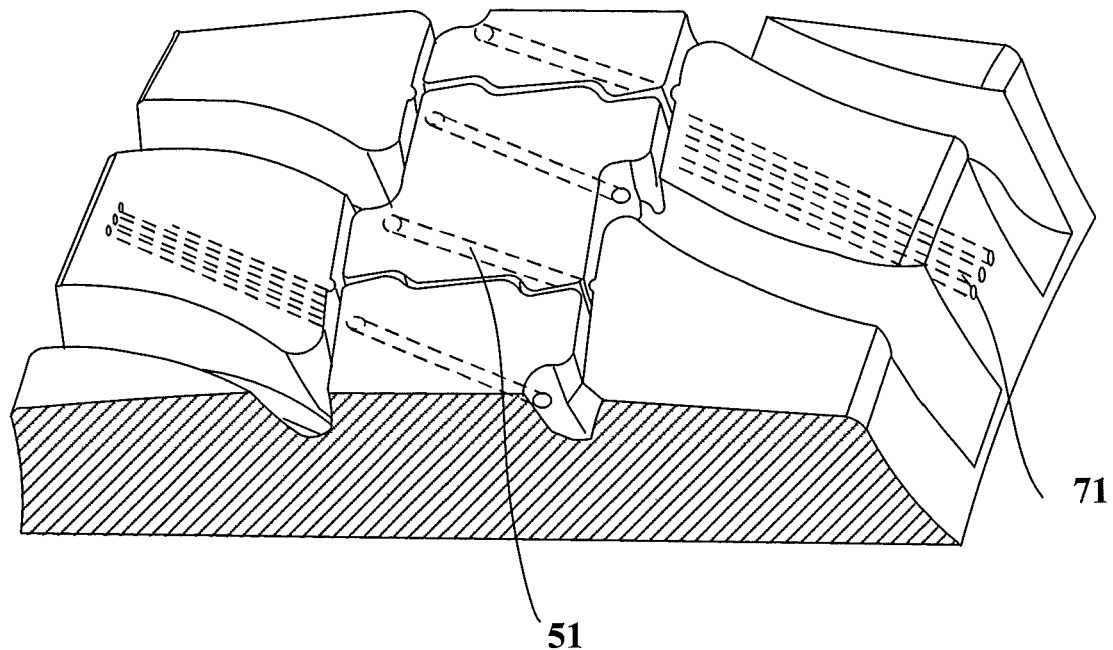
FIG. 3 is a perspective view of part of the tread according to the first alternative form.

FIG. 3 shows a perspective view of part of the tread according to the first alternative form of the invention. In the blocks in the central part, the channels 51 open at their ends into the circumferential grooves and one of these ends also opens in the continuation of a transverse groove running through a shoulder part. Further, the blocks of the shoulder parts are provided with three channels 71 opening at both ends, these channels being substantially mutually parallel.

In order to increase the exchanges of heat between the material of the central part 21 and the air flowing through the channels 51 and thus obtain a lower temperature level in use, it is judicious for the surface heat exchange area in each channel to be increased without in so doing reducing the rigidity of the central part.

Figure 4:
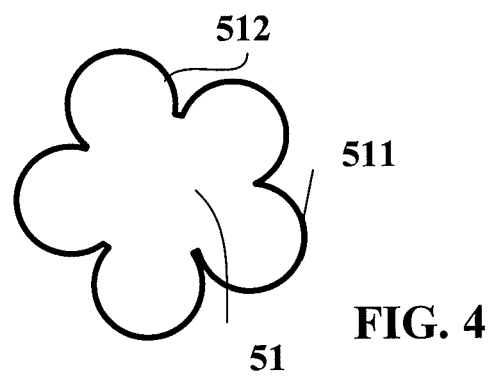
FIG. 4 shows an alternative shape of ventilation channel cross section for a tread according to the invention.

FIG. 4 thus shows an alternative "daisy" shaped cross section of channel 51 the outline 511 of which is formed of a succession of circular arcs 512 which intersect one another in twos. This special shape affords an advantageous effect because the heat exchange area is very much increased without thereby leading to too great a reduction in the rigidity under load of the block in which this channel is created. Specifically, for a given volume of absent material, the heat exchange area is increased. The shape shown is not in any way limiting and any other shape may be adopted for the channels.

Figure 5:
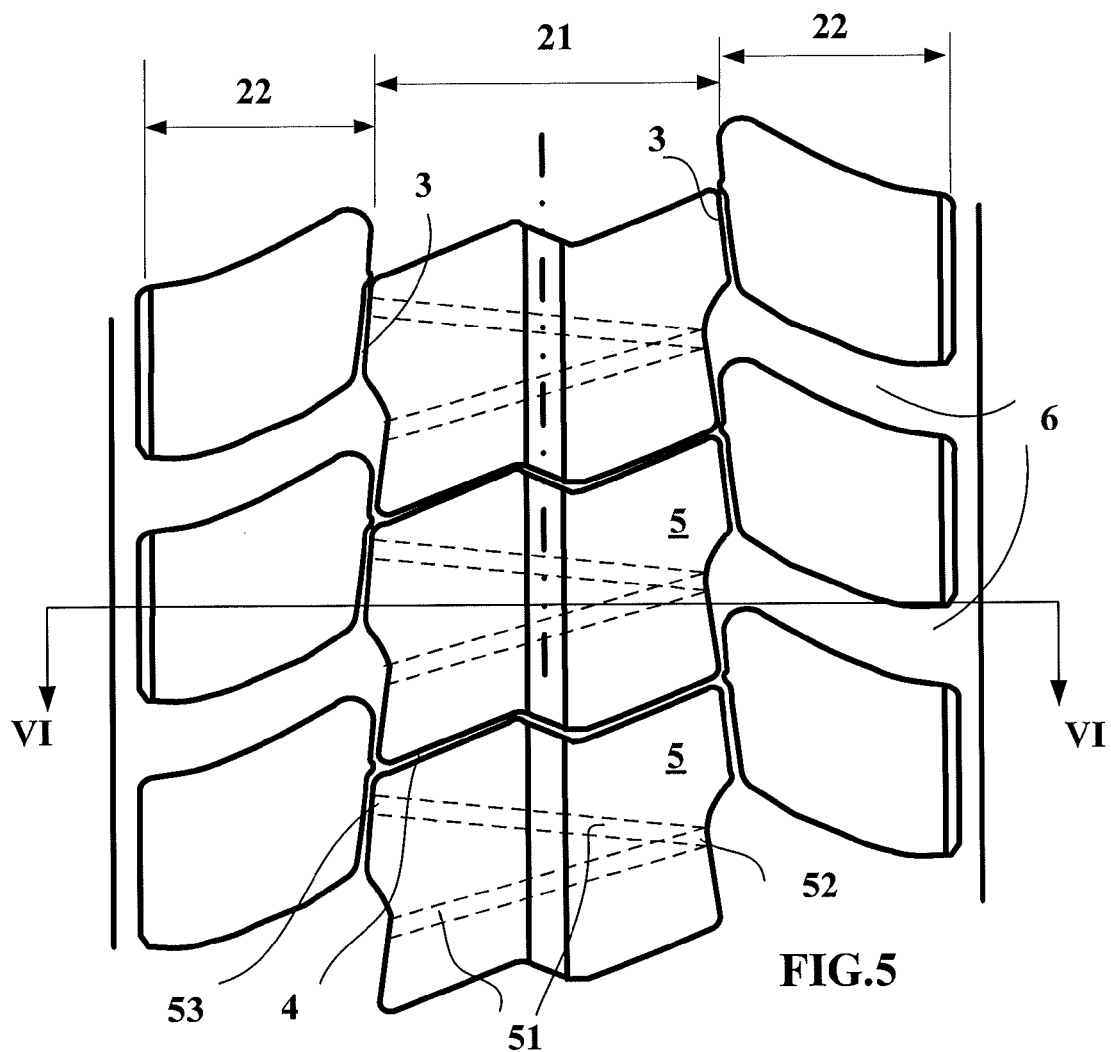
FIG. 5 shows a surface view of a tread of the tire according to a second alternative form of the invention.

FIG. 5 shows a partial view of the tread surface of a tread according to another alternative form of the invention as applied to a tire size 40.00 R 57 with an XDR2 tread pattern. This second alternative form differs from the first alternative form of the invention shown in FIGS. 1, 2 and 3 in that the design of the transverse grooves of the shoulder parts gives the tread a directional nature. In this alternative form, the blocks of rubber 5 in the central part 21 are provided with two channels 51 under the tread surface, each of these channels 51 extending from one lateral face of the blocks 5 to the other, opening into the circumferential grooves 4 at both ends 52, 53. The dimensions adopted in this alternative form are similar to those given for the first alternative form, notably the channels 51 are of circular cylindrical shape with a diameter of 24 mm. Further, the two channels 51 of one and the same block 5 are connected together at one of their ends 52, that is to say that they open onto a lateral face of the block 5 via a common opening: this arrangement has the advantage of encouraging continuity between the two channels 51.

As FIG. 5 shows, an additional circumferential groove 41 the depth of which is small by comparison with the depth of the circumferential grooves 4 that delimit the central part 21 (in this particular instance, the depth of this additional groove 41 is 47 mm while the main grooves have a mean depth of 78.5 mm) has been provided on the blocks 5. The function of this additional groove is, in the known way, to encourage a lowering of the level of heat in the central part in use.

Figure 6:
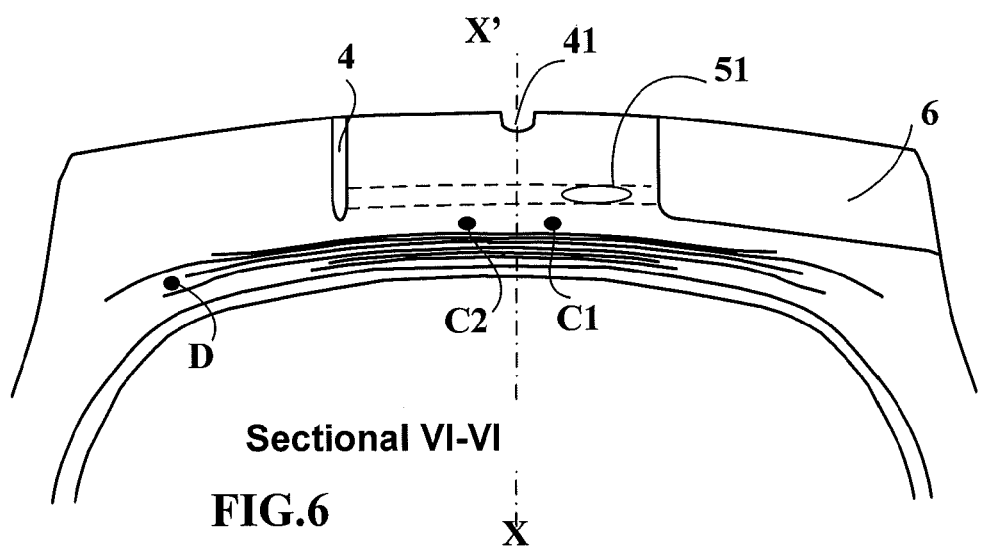
FIG. 6 shows a view in section on a plane of section labeled VI-VI in FIG. 5.

FIG. 6 shows a view in cross section on a plane of section VI-VI of the alternative form shown in FIG. 5; this FIG. 6 clearly shows two channels 51 of one and the same block 5 opening via one and the same opening in line with a transverse groove 7 of a shoulder part 22.

Thanks to the presence of the channels 51 and that of the additional groove 41 in the central part 21, the temperatures, measured under identical running conditions, between a reference tire bearing one same tread and a tire bearing a tread according to this second alternative form, clearly show a gain of the order of 10 to 15 degrees Celsius depending on the running speeds.

The measurements are taken using thermocouples embedded in the tread at the locations indicated in FIGS. 5 and 6 by the references (C1, C2) near the crown reinforcement. The measurements are taken with a tire inflated to a pressure of 6 bar, under a load of 48 metric tons and at the speeds of 15 and 20 km/h.

These measurements which are collated in Table II allow the highly favorable impact of the presence of channels in the central part of the tread to be compared, on one and the same tire.

TABLE II

| 40.00 R 57 | Temperature at point C1 (° C.) | | Temperature at point C2 (° C.) | |
|---|---|---|---|---|
| XDR2 Speed (km/h) | Without channels | With channels | Without channels | With channels |
| 15 km/h | 92 | 84 | 89 | 84 |
| 20 km/h | 109 | 96 | 108.5 | 102 |

In addition, measurements were taken on the shoulder part which is provided with three channels opening on each side. These comparative measurements are given in Table III.

TABLE III

| 40.00 R 57 XDR2 | Temperature at point D (° C.) | |
|---|---|---|
| Speed (km/h) | Without channels | With channels |
| 15 km/h | 81 | 72.5 |
| 20 km/h | 96 | 85.5 |

Figure 7:
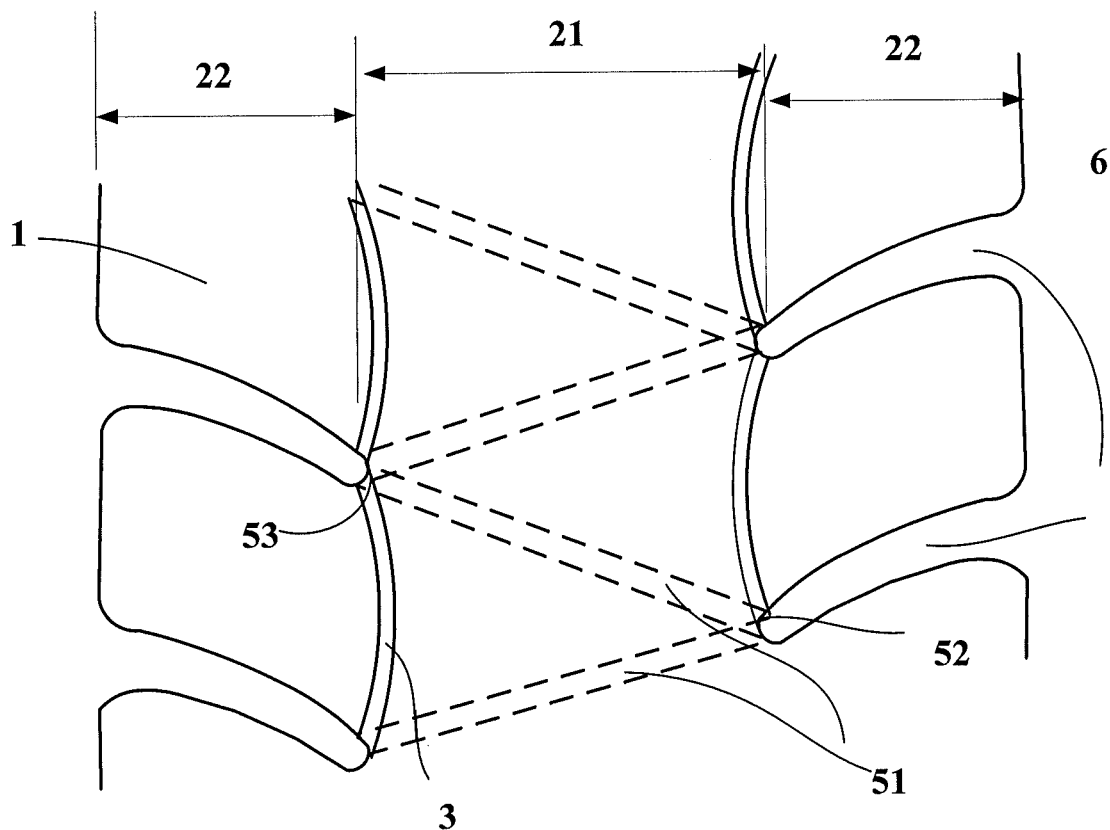
FIG. 7 shows a third alternative form of tread according to the invention.

In a third alternative form according to the invention and which is shown in FIG. 7, the channels 51 formed in the central part 21 of the tread 1 are interconnected to form a network of channels zigzagging circumferentially around the tire: a channel is connected at both ends 52, 53 to two other channels. Thus, there is continuity between all of the channels in the central part, and this further improves the efficacy of the ventilation within the said channels. Each channel opens into two circumferential grooves 3 and into two transverse grooves 6 at the points where two channels interconnect.

The alternative forms described and shown here have been so merely to illustrate the principle of the invention and do not in any way limit the scope thereof.

The invention claimed is:

1. A tire tread for civil engineering works vehicle, this tread having a tread surface intended to come into contact with the ground, this tread comprising a central part delimited by grooves of circumferential overall orientation, these grooves delimiting shoulder parts axially towards the outside of the central part, wherein each shoulder part is provided with a plurality of transverse grooves delimiting a plurality of blocks, the transverse grooves having a cross section of minimum area (ST) and being distributed substantially uniformly in the circumferential direction, wherein the central part comprises a plurality of grooves of transverse overall orientation uniformly distributed in the circumferential direction and delimiting, with the circumferential grooves, a plurality of blocks, each of these blocks comprising at least two channels under the tread surface, each channel opening into a transverse groove of a shoulder art and into two circumferential grooves, wherein the central part is provided with a plurality of channels extending transversely under the tread surface and passing right through the central part, wherein each channel comprises a first and a second end, these first and second ends opening into the grooves of circumferential overall orientation, wherein at least one end of each channel opens into a transverse groove of the shoulder parts, and wherein each channel has a cross-sectional area (SC) at least equal to 5% of the area of the minimum cross section (ST) of the transverse groove into which it opens.

2. The tread according to claim 1 wherein each channel of the central part has a mean line that is substantially in the continuation of a mean direction of the transverse groove into which it opens, so that an angular offset between the mean directions of the transverse groove and of the channel is at most equal to 15 degrees.

3. The tread according to claim 1 wherein the channels have, considered in twos, substantially crossed orientations, that is to say orientations that between them make a mean angle of at least 10°, and wherein a channel is connected at one of its ends to one end of another channel, so as to create continuity in the volumes of air circulating through these interconnected channels.

4. The tread according to claim 1 wherein the channels in the central part have a wall area that is at least equal to $0.6 dm^2$ per unit block volume expressed in $dm^3$.

5. The tread according to claim 1 wherein the channels are formed at a distance from the tread surface which exceeds half the thickness of the central part of the tread so as to be as close as possible to a crown reinforcement.

6. The tread according to claim 1 wherein the cross-sectional area of each channel is greater than or equal to 20% and at most equal to 30% of the cross-sectional area of the transverse groove into which the channel opens.

7. The tread according to claim 1 wherein the shoulder parts are provided with a plurality of channels that open both to the outside of the tread and into a circumferential groove delimiting a shoulder part.

8. The tread according to claim 7 wherein the number of channels formed in the shoulder parts exceeds the number of channels formed in the central part.

9. A tire for civil engineering works vehicle having a carcass reinforcement surmounted radially on the outside by a crown reinforcement, the latter being itself surmounted radially on the outside by a tread defined in claim 1.

* * * * *